US012436356B2

(12) United States Patent
Riegler et al.

(10) Patent No.: US 12,436,356 B2
(45) Date of Patent: Oct. 7, 2025

(54) LENS SYSTEM INCLUDING DISTANCE MEANS FOR A VEHICLE HEADLAMP

(71) Applicant: ZKW Group GmbH, Wieselburg (AT)

(72) Inventors: Hans-Jörg Riegler, Petzenkirchen (AT); Christian Jackl, Wieselburg (AT); Alexander Hacker, Wilhelmsburg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/703,469

(22) PCT Filed: Oct. 20, 2022

(86) PCT No.: PCT/EP2022/079159
§ 371 (c)(1),
(2) Date: Apr. 22, 2024

(87) PCT Pub. No.: WO2023/078683
PCT Pub. Date: May 11, 2023

(65) Prior Publication Data
US 2025/0116839 A1    Apr. 10, 2025

(30) Foreign Application Priority Data

Nov. 3, 2021  (EP) .................................... 21206250

(51) Int. Cl.
*G02B 7/02*    (2021.01)
*F21S 41/27*   (2018.01)
(52) U.S. Cl.
CPC .............. *G02B 7/021* (2013.01); *F21S 41/27* (2018.01)
(58) Field of Classification Search
CPC .................... F21S 41/27; G02B 7/021
See application file for complete search history.

(56) References Cited

U.S. PATENT DOCUMENTS

2007/0121223 A1  5/2007  Watanabe
2009/0080094 A1* 3/2009  Chen .................. G02B 7/021
                                              29/428

(Continued)

FOREIGN PATENT DOCUMENTS

JP       2016083994 A    5/2016
KR     20200082303 A    7/2020

OTHER PUBLICATIONS

Extended European Search Report for European Patent Application No. 21206250.9 dated May 12, 2022 (5 Pages).

(Continued)

*Primary Examiner* — Keith G. Delahoussaye
(74) *Attorney, Agent, or Firm* — Eversheds Sutherland (US) LLP

(57) ABSTRACT

Lens system (1) for a vehicle headlamp, wherein the lens system (1) comprises a light source (2), an array (3) of consecutively arranged lenses (3a, 3b, 3c), and a lens holding member (4), which is configured to encase the array (3) of lenses, wherein an entrance lens (3a), a first distance means (5a), at least one intermediate lens (3b), a last distance means (5b) and an exit lens (3c) are arranged consecutively within the lens holding member, wherein the last distance means (5b) enables a sprung connection between the exit lens (3c) and the at least one intermediate lens (3b) in such a way that a force, caused by a displacement of the entrance (3a) and/or the intermediate lens (3b) along a longitudinal axis (x) due to thermal expansion, which acts towards the exit lens (3c) is absorbed by a compression of the last distance means (5b).

15 Claims, 1 Drawing Sheet

(56) References Cited

U.S. PATENT DOCUMENTS

2019/0101718 A1    4/2019   Masuzawa et al.
2022/0099913 A1*   3/2022   Blake, III .............. G03B 17/12

OTHER PUBLICATIONS

Search Report and Written Opinion for International Patent Application No. PCT/EP2022/079159 dated Feb. 2, 2023 (11 Pages).

* cited by examiner

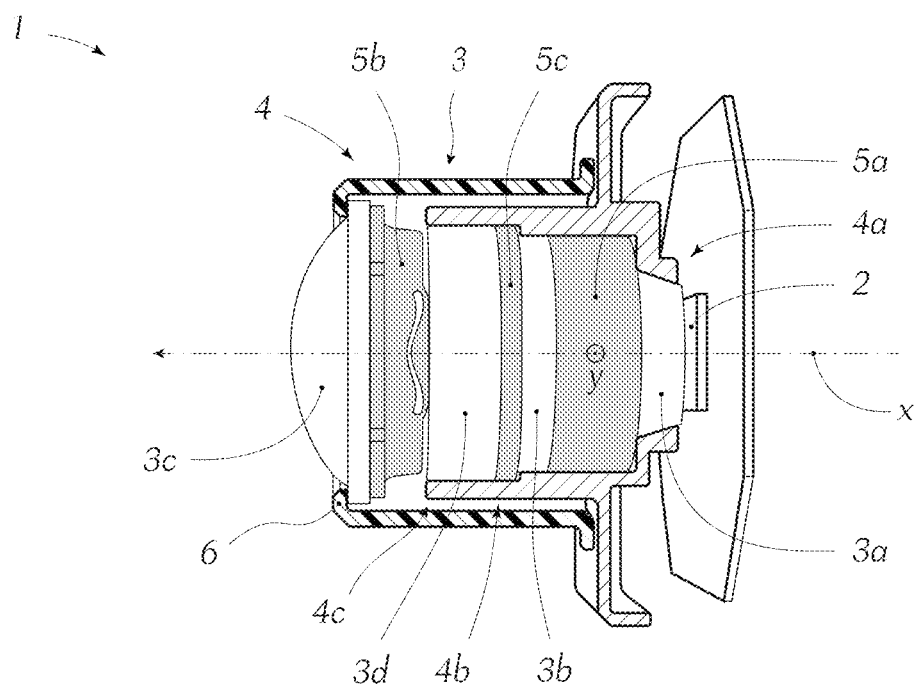

LENS SYSTEM INCLUDING DISTANCE MEANS FOR A VEHICLE HEADLAMP

FIELD OF THE INVENTION AND DESCRIPTION OF PRIOR ART

The invention relates to a lens system for a vehicle headlamp, wherein the lens system comprises
a light source,
an array of consecutively arranged lenses, said array of lenses is configured to receive light from the light source, wherein each lens of the array of lenses has
a light receiving side, wherein a portion of the light receiving side is configured as a light entry surface, through which light enters the lens, and
a light emitting side for emitting light, wherein a portion of the light emitting side is configured as a light exit surface, through which light exits the lens, wherein the light receiving side is opposite to the light emitting side, wherein the array of lenses is configured to project the light from the light source as a light pattern in front of the lens system,
a lens holding member, which is configured to encase the array of lenses, wherein said lens holding member has a first end portion, a second end portion and body structure, in particular a hollow body structure, with a longitudinal extension in a longitudinal axis, wherein the body structure extends from the first end portion to the second end portion.

The invention also relates to a vehicle headlamp, comprising a lens system.

Lens systems for vehicle headlamps comprising an array of lenses are well known from the prior art. Usually, individual lenses are arranged in a housing-structure and spaced apart from each other by spacers. The lenses of the array of lenses as well as the spacers are subject to thermal expansion, since there are in close proximity to a light source. The thermal expansion and a subsequent cooling (in case the light source is turned off) leads to a loosening of the lenses within the housing. This leads to errors in the ideal light distribution or light pattern which can be created with the lens system.

It is therefore an object of the present invention to reduce thermal effects on the components of a lens system for a vehicle headlamp.

This object is solved with a lens system according to claim 1. Preferred embodiments are described in depended claims.

SUMMARY OF THE INVENTION

According to a first aspect of the invention, the array of lenses comprises
an entrance lens, which is mounted to the first end portion of the lens holding member, wherein the entrance lens is configured to receive the light from the light source and to emit the light towards the other lenses of the array of lenses,
at least one intermediate lens, wherein a first distance means is arranged between the intermediate lens and the entrance lens, wherein the light receiving side of the intermediate lens partially contacts the first distance means, wherein the light emitting side of the entrance lens partially contacts the first distance means, said first distance means is configured to prohibit movement of the intermediate lens towards the entrance lens by contacting a first contact face of the body structure,
an exit lens, which is arranged at the second end portion of the lens holding member in such a way that the light emitting side of the exit lens partially contacts a holding protrusion of the second end portion of the lens holding member, wherein the light receiving side of the exit lens partially contacts a last distance means, wherein the last distance means is elastic and arranged between the at least one intermediate lens and the exit lens and is configured to establish a sprung connection between the at least one intermediate lens and the exit lens,
wherein the at least one intermediate lens is retained within the body structure such that the at least one intermediate lens can only move along the longitudinal axis of the lens holding member, wherein the sprung connection is such that a force, caused by a displacement of the entrance and/or the intermediate lens along the longitudinal axis due to thermal expansion, which acts towards the exit lens is absorbed by a compression of the last distance means.

This has the advantage, that a force caused by the thermal expansion of the entrance lens and the at least one intermediate lens can be compensated by the elastic last distance means. This results in a thermally more stable lens system. The last distance means can be configured to be reversibly compressible along the longitudinal axis and/or the longitudinal extension of the lens holding member.

Preferably, the last distance means compresses during heating and expands during subsequent cooling (for example when the light source is turned off), due to the force caused by the displacement of the entrance or the intermediate lens along the longitudinal axis due to thermal expansion of said lenses.

Preferably, the last distance means comprises an elastic portion, which enables the compression and expansion of the last distance means along the longitudinal extension (or axis) of the lens holding member. The elastic portion can be a spring element. The elastic portion of the last distance means can be in a direct contact with the light emitting side of the at least one intermediate lens and/or the light receiving side of the exit lens.

Preferably, the first distance means keeps a constant distance between the entrance lens and the at least one intermediate lens. The distance between the first intermediate lens and the exit lens can vary due to the thermal expansion of the lenses. The last distance means is configured to enable a temperature depended distance between the second to last lens (also referred to as the at least one intermediate lens) and the last lens (also referred to as the exit lens).

Preferably, at higher temperatures (when the light source is turned on and generates light and heat) the distance between the at least one intermediate lens and the exit lens is smaller compared to the distance between the at least one intermediate lens and the exit lens at lower temperatures (when the light source is turned off and generates no light and no heat).

The longitudinal extension of the lens holding member preferably extends along the longitudinal axis of the lens holding member. The lens holding member can comprise a single element or multiple elements.

The light entry or exit surface of each lens can be a portion of the entire light receiving or emitting side of the corresponding lens. The light entry or exit surface of each lens can also be essentially the entire light receiving or emitting side of the corresponding lens. The contact face can be a protrusion, which extends from the body structure of the lens holding member towards the longitudinal axis of the lens holding member.

Advantageously, the first distance means has a rigidity that is at least 2-times, preferably more than 4-times, more preferably more than 6-times, even more preferably more than 8-times, higher than the rigidity of the last distance means. Advantageously, this ensures that the first distance means keeps an essentially constant distance between the entrance lens and the at least one intermediate lens.

Preferably, the last distance means has a higher elasticity than the first distance means.

Advantageously, the lens system comprises a further, preferably multiple, intermediate lenses, arranged between the at least one first intermediate lens and the exit lens, wherein the further intermediate lens is retained within the body structure such that the further intermediate lens can only move along the longitudinal axis of the lens holding member, wherein a further distance means is arranged between the further intermediate lens and the at least one intermediate lens, wherein the light receiving side of the further intermediate lens partially contacts the further distance means, wherein the light emitting side of the further intermediate lens partially contacts the last distance means, wherein the light emitting side of the at least one intermediate lens partially contacts the further distance means, said further distance means is configured to prohibit movement of the further intermediate lens towards the at least one intermediate lens by contacting a further contact face of the body structure.

Preferably, the entrance lens, the at least one intermediate lens (which can be referred to as a first intermediate lens), the further intermediate lens (which can be referred to as a second intermediate lens) and the exit lens have different optical properties and are configured to create a light distribution or a light function for a vehicle headlamp. There can be a third or more intermediate lenses, which are arranged between the entrance lens and the exit lens, wherein between two consecutive intermediate lenses can be a corresponding distance means. Regardless of the number of intermediate lenses, between the entrance lens and the exit lens, the distance means between the exit lens (the last lens) and the second to the last lens is preferably an elastic distance means, i.e. a distance means with an elastic portion and with a higher elasticity compared to the other distance means. The further contact face can be a protrusion, which extends from the body structure of the lens holding member towards the longitudinal axis of the lens holding member.

Advantageously, each lens of the array of lenses is a circular spherical lens, wherein preferably the body structure of the lens holding member has a cylindrical shape. Advantageously, these so-called barrel-type lens systems can have a broad use in vehicle headlamp applications.

Advantageously, the holding protrusion of the second end portion of the lens holding member has a shape corresponding to a circumference of the exit lens. Advantageously, this enables an easy and secure mounting of the exit lens to the second end portion of the lens holding member. Preferably, an entire edge portion of the exit lens, in particular an edge portion of the light emitting side of the exit lens, contacts the holding protrusion of the second end portion of the lens holding member. The holding protrusion can prohibit movement of the exit lens along the longitudinal axis, in particular in the direction of light propagation.

Advantageously, the lens system further comprises a sleeve member, which has a shape corresponding to the second end portion of the lens holding member, wherein the sleeve member is configured to be imposed on the second end portion of the lens holding member in such a way that, when the sleeve member is imposed on the second end portion of the lens holding member, the sleeve member fixates the position of the exit lens relative to the second end portion of the lens holding member.

Advantageously, the sleeve member can enable a quick and easy and preferably tool-free mounting of the exit lens to the second end portion of the lens holding member.

Preferably, the lens holding member has a cylindrical shape with a first radius and the sleeve member has a cylindrical shape with a second radius, wherein the first radius is smaller than the second radius.

Advantageously, the sleeve member, when imposed on the second end portion, extends along the outside of the lens holding member from the second end portion towards the first end portion over at least 30% of the total longitudinal extension of the lens holding member. Advantageously, this enables a particularly secure mounting of the exit lens to the second end portion of the lens holding member.

Advantageously, the lens holding member has a cascading cross section from the first end portion towards the second end portion, wherein the cascade comprises of a plurality of steps, wherein consecutive steps have an offset in a direction perpendicular to the longitudinal extension of the lens holding member.

Advantageously, a lens of the array of lenses is arranged at each step of the cascading lens holding member respectively. Preferably, on each step of the cascade one lens is arranged.

Advantageously, the first distance means comprise a material which has a coefficient of thermal expansion which is higher than the coefficient of thermal expansion of the material of the lenses of the array of lenses. Preferably, every distance means has a coefficient of thermal expansion that is larger than the coefficient of thermal expansion of the material of the lenses. This choice of material has the advantage, that the heat created by the light source (and/or the heat resulting from varying ambient temperature in the proximity of the lens system, e.g. seasonal temperature changes) effects the distance means less than the lenses.

Advantageously, the lenses of the array of lenses are arranged parallel to each other. This arrangement has the advantage of a very compact structure within the lens holding member of the lens system.

Advantageously, each lens of the array of lenses has an optical axis, wherein the lenses are arranged in such a way that the optical axis of all lenses is co-axial.

Advantageously, the lens holding member comprises a material which is opaque for the light from the light source. In other words, the light irradiated by the light source cannot pass through the lens holding member. The lens holding member can be configured as a light blocking member, so that light from the light source can exit the lens system only through the exit lens.

Advantageously, each distance means has an essentially annular shape with a pass-through opening, wherein the light from the light source passes through the opening of each distance means. Advantageously, light from the light source passes through every lens of the array of lenses and through every pass-through opening of every distance means. The pass-through openings can correspond to the shape and the size of the light exit surface and the light entry surface of each lens of the array of lenses. The shape and size of each pass-through opening can correspond to the shape and the size of the light exit surface (or the light emitting side) and the light entry surface (or the light receiving side)

of the lenses that are arranged on either side of the corresponding distance means. For example, the pass-through opening of the first distance means can correspond (in its shape and size) to the light emitting side (or the light exit surface) of the entrance lens and the light receiving side (or the light entry surface) of the at least one intermediate lens.

According to another aspect of the invention, a vehicle headlamp can comprise a lens system according to the first aspect of the invention.

BRIEF DESCRIPTION OF THE DRAWINGS

In the following, in order to further demonstrate the present invention, illustrative and non-restrictive embodiments are discussed, as shown in the drawings, wherein:

FIG. 1 shows a cross-sectional view of a lens system according to the invention.

DETAILED DESCRIPTION OF EMBODIMENTS OF THE INVENTION

In the following FIGURES identical reference signs refer to identical features unless expressly depicted otherwise. The reference signs are only for informational purpose and do not delimit the scope of protection.

For the sake of simplicity, elements which are not essential to the invention are not shown in the FIGURE.

FIG. 1 shows a cross-sectional view of a lens system 1 for a vehicle headlamp. The lens system 1 comprises a light source 2 and an array 3 of consecutively arranged lenses 3a, 3b, 3c, 3d. The array 3 of lenses is configured to receive light from the light source 2.

Each lens 3a, 3b, 3c, 3d of the array 3 of lenses has a light receiving side, wherein a portion of the light receiving side is configured as a light entry surface, through which light enters the lens 3a, 3b, 3c, 3d. Each lens 3a, 3b, 3c, 3d of the array 3 of lenses has a light emitting side for emitting light, wherein a portion of the light emitting side is configured as a light exit surface, through which light exits the lens 3a, 3b, 3c, 3d. The light receiving side is opposite to the light emitting side, wherein the array 3 of lenses is configured to project the light from the light source 2 as a light pattern in front of the lens system 1.

The lens system 1 comprises a lens holding member 4, which is configured to encase the array 3 of lenses. The lens holding member 4 has a first end portion 4a, a second end portion 4c and body structure 4b, in particular a hollow body structure, with a longitudinal extension, which extends along a longitudinal axis x, wherein the body structure 4b extends from the first end 4a portion to the second end portion 4c. The lens holding member 4 can comprise a material which is opaque for the light from the light source 2.

The array 3 of lenses comprises an entrance lens 3a, which is mounted to the first end portion 4a of the lens holding member 4. The entrance lens 3a is configured to receive the light from the light source 2 and to emit the light towards the other lenses of the array 3 of lenses.

The array 3 of lenses further comprises at least one intermediate lens 3b (which can also be referred to as a first intermediate lens), wherein a first distance means 5a is arranged between the intermediate lens 3b and the entrance lens 3a. The light receiving side of the intermediate lens 3b partially contacts the first distance means 5a. The light emitting side of the entrance lens 3a partially contacts the first distance means 5a. The first distance means 5a is configured to prohibit movement of the intermediate lens 3b towards the entrance lens 3a by contacting a first contact face of the body structure 4b. The at least one intermediate lens 3b is retained within the body structure 4b such that the at least one intermediate lens 3b can move only along the longitudinal axis x of the lens holding member 4.

The array 3 of lenses further comprises an exit lens 3c (or the last lens), which is arranged at the second end portion 4c of the lens holding member 4 in such a way that the light emitting side of the exit lens 3c partially contacts a holding protrusion of the second end portion 4c of the lens holding member 4. The light receiving side of the exit lens 3c partially contacts a last distance means 5b. The last distance means 5b is elastic and can be arranged between the at least one intermediate lens 3b and the exit lens 3c (in general the last distance means is arranged between the last lens, i.e. the exit lens 3c, and the second the last lens) and is configured to establish a sprung connection between the at least one intermediate lens 3b and the exit lens 3c. The first distance means 5a can have a rigidity that is at least 2-times higher than the rigidity of the last distance means 5b.

The sprung connection of the at least one intermediate lens 3b and the exit lens 3c is such that a force, caused by a displacement of the entrance lens 3a or the intermediate lens 3b along the longitudinal axis x due to thermal expansion, which acts towards the exit lens 3c is absorbed by a compression of the last distance means 5b.

In the embodiment shown in FIG. 1, the lens system 1 comprises a further intermediate lens 3d, which is arranged between the at least one intermediate 3b lens and the exit lens 3c. The lens system can also comprise of two, three or more intermediate lenses. The further intermediate lens 3d (which can also be referred to as a second intermediate lens) is retained within the body structure 4b in such a way, that the further intermediate lens 3d can only move along the longitudinal axis x of the lens holding member 4. A further distance means 5c (which can also be referred to as a second distance means) is arranged between the further intermediate lens 3d and the at least one intermediate lens 3b. The light receiving side of the further intermediate lens 3d partially contacts the further distance means 5c. The light emitting side of the further intermediate lens 3d partially contacts the last distance means 5b. The light emitting side of the at least one intermediate lens 3b partially contacts the further distance means 5c. The further distance means 5c is configured to prohibit movement of the further intermediate lens 3d towards the first intermediate lens 3b by contacting a further contact face of the body structure 4b.

In the shown embodiment, each lens of the array 3 of lenses is a circular spherical lens, wherein preferably the body structure 4b of the lens holding member 4 has a cylindrical shape. Non-circular spherical lenses can also be used for the array 3 of lenses.

In the case of circular spherical lenses, the holding protrusion of the second end portion 4c of the lens holding member 4 can have a circular ring-like shape that corresponds to a circumference of the exit lens 3c. In general, the shape of the holding protrusion of the second end portion 4c of the lens holding member 4 can have a shape that corresponds to the shape of the lenses.

The lens system 1 can further comprise a sleeve member 6, which has a shape corresponding to the second end portion 4c of the lens holding member 4. The sleeve member 6 is configured to be imposed on the second end portion 4c of the lens holding member 4 in such a way that, when the sleeve member 6 is imposed on the second end portion 4c of the lens holding member 4, the sleeve member 6 fixates the position of the exit lens 3c relative to the second end portion 4c of the lens holding member 4. The sleeve member 6, when imposed on the second end portion 4c, extends along the outside of the lens holding member 4 from the second end portion 4c towards the first end portion 4a over at least 30% of the total longitudinal extension of the lens holding member 4. The sleeve member 6 can also extend as far as the first end portion 4a of the lens holding member 4.

The lens holding member 4 can have a cascading cross section from the first end portion 4a towards the second end portion 4c, wherein the cascade comprises of a plurality of steps, wherein consecutive steps have an offset in a direction perpendicular to the longitudinal extension of the lens holding member 4. A lens of the array 3 of lenses, preferably exactly one lens, is arranged at each step of the cascading lens holding member 4 respectively.

The first distance means 5a and/or the further distance means 5c and/or the last distance means 5b can comprise a material which has a coefficient of thermal expansion which is higher than the coefficient of thermal expansion of the material of the lenses of the array 3 of lenses. Each distance means 5a, 5b, 5c can have an essentially annular shape with a pass-through opening, wherein the light from the light source 2 passes through the opening of each distance means 5a, 5b, 5c.

As seen in FIG. 1, the lenses 3a, 3b, 3c, 3d of the array 3 of lenses are arranged parallel to each other. Furthermore, each lens 3a, 3b, 3c, 3d of the array 3 of lenses has an optical axis, wherein the lenses are arranged in such a way that the optical axis of all lenses 3a, 3b, 3c, 3d are co-axial.

Of course, the invention is not limited to the examples given in this specification, which merely show embodiments of the invention that can be carried out by a person skilled in the art in view of this disclosure.

The invention claimed is:

1. A vehicle headlamp comprising:
   a lens system (1) which comprises:
   a light source (2);
   an array (3) of consecutively arranged lenses (3a, 3b, 3c), wherein said array (3) of lenses is configured to receive light from the light source (2), wherein each lens (3a, 3b, 3c) of the array (3) of lenses has:
   a light receiving side, wherein a portion of the light receiving side is configured as a light entry surface, through which light enters the lens (3a, 3b, 3c), and
   a light emitting side for emitting light, wherein a portion of the light emitting side is configured as a light exit surface, through which light exits the lens (3a, 3b, 3c),
   wherein the light receiving side is opposite to the light emitting side, wherein the array (3) of lenses is configured to project the light from the light source (2) as a light pattern in front of the lens system (1); and
   a lens holding member (4), which is configured to encase the array (3) of lenses, wherein said lens holding member (4) has a first end portion (4a), a second end portion (4c) and a hollow body structure (4b) with a longitudinal extension in a longitudinal axis (x), wherein the body structure (4b) extends from the first end (4a) portion to the second end portion (4c),
   wherein the array (3) of lenses comprises:
   an entrance lens (3a), which is mounted to the first end portion (4a) of the lens holding member (4), wherein the entrance lens (3a) is configured to receive the light from the light source (2) and to emit the light towards the other lenses of the array (3) of lenses,
   at least one intermediate lens (3b), wherein a first distance means (5a) is arranged between the intermediate lens (3b) and the entrance lens (3a), wherein the light receiving side of the intermediate lens (3b) partially contacts the first distance means (Sa), wherein the light emitting side of the entrance lens (3a) partially contacts the first distance means (5a), said first distance means (5a) is configured to prohibit movement of the intermediate lens (3b) towards the entrance lens (3a) by contacting a first contact face of the body structure (4b), and
   an exit lens (3c), which is arranged at the second end portion (4c) of the lens holding member (4) in such a way that the light emitting side of the exit lens (3c) partially contacts a holding protrusion of the second end portion (4c) of the lens holding member (4), wherein the light receiving side of the exit lens (3c) partially contacts a last distance means (Sb), wherein the last distance means (5b) is elastic and arranged between the at least one intermediate lens (3b) and the exit lens (3c) and is configured to establish a sprung connection between the at least one intermediate lens (3b) and the exit lens (3c),
   wherein the at least one intermediate lens (3b) is retained within the body structure (4b) such that the at least one intermediate lens (3b) can only move along the longitudinal axis (x) of the lens holding member (4), and
   wherein the sprung connection is such that a force, caused by a displacement of the entrance lens (3a) and/or the at least one intermediate lens (3b) along the longitudinal axis (x) due to thermal expansion, which acts towards the exit lens (3c) is absorbed by a compression of the last distance means (5b).

2. The vehicle headlamp according to claim 1, wherein the first distance means (5a) has a rigidity that is at least 2-times greater than the rigidity of the last distance means (5b).

3. The vehicle headlamp according to claim 1, wherein the lens system (1) further comprises a further intermediate lens (3d), which is arranged between the at least one intermediate (3b) lens and the exit lens (3c), wherein the further intermediate lens (3d) is retained within the body structure (4b) such that the further intermediate lens (3d) can only move along the longitudinal axis (x) of the lens holding member (4), wherein a further distance means (5c) is arranged between the further intermediate lens (3d) and the at least one intermediate lens (3b), wherein the light receiving side of the further intermediate lens (3d) partially contacts the further distance means (5c), wherein the light emitting side of the further intermediate lens (3d) partially contacts the last distance means (5b), wherein the light emitting side of the at least one intermediate lens (3b) partially contacts the further distance means (5c), said further distance means (5c) is configured to prohibit movement of the further intermediate lens (3d) towards the first intermediate lens (3b) by contacting a further contact face of the body structure (4b).

4. The vehicle headlamp according to claim 1, wherein each lens of the array (3) of lenses is a circular spherical lens.

5. The vehicle headlamp according to claim 1, wherein the holding protrusion of the second end portion (4c) of the lens holding member (4) has a shape corresponding to a circumference of the exit lens (3c).

6. The vehicle headlamp according to claim 1, wherein the lens system (1) further comprises a sleeve member (6), which has a shape corresponding to the second end portion (4c) of the lens holding member (4), wherein the sleeve member (6) is configured to be imposed on the second end portion (4c) of the lens holding member (4) in such a way that, when the sleeve member (6) is imposed on the second end portion (4c) of the lens holding member (4), the sleeve member (6) fixates the position of the exit lens (3c) relative to the second end portion (4c) of the lens holding member (4).

7. The vehicle headlamp according to claim 6, wherein the sleeve member (6), when imposed on the second end portion (4c), extends along the outside of the lens holding member (4) from the second end portion (4c) towards the first end portion (4a) over at least 30% of the total longitudinal extension of the lens holding member (4).

8. The vehicle headlamp according to claim 1, wherein the lens holding member (4) has a cascading cross section from the first end portion (4a) towards the second end portion (4c), wherein the cascade comprises of a plurality of steps, wherein consecutive steps have an offset in a direction perpendicular to the longitudinal extension of the lens holding member (4).

9. The vehicle headlamp according to claim 8, wherein a different lens of the array (3) of lenses is arranged at each step of the cascading lens holding member (4) respectively.

10. The vehicle headlamp according to claim 1, wherein the lenses (3a, 3b, 3c) of the array (3) of lenses are arranged parallel to each other.

11. The vehicle headlamp according to claim 1, wherein each lens (3a, 3b, 3c) of the array (3) of lenses has an optical axis, wherein the lenses are arranged in such a way that the optical axis of all lenses (3a, 3b, 3c) are co-axial.

12. The vehicle headlamp according to claim 1, wherein the lens holding member (4) comprises a material which is opaque for the light from the light source (2).

13. The vehicle headlamp according to claim 2, wherein the first distance means (5a) has a rigidity that is at least 4-times greater than the rigidity of the last distance means (5b).

14. The vehicle headlamp according to claim 3, wherein the lens system (1) further comprises multiple intermediate lenses (3d) arranged between the at least one intermediate (3b) lens and the exit lens (3c).

15. The vehicle headlamp according to claim 4, wherein the body structure (4b) of the lens holding member (4) has a cylindrical shape.

* * * * *